United States Patent
Renfrew et al.

[11] 3,801,270
[45] Apr. 2, 1974

[54] YELLOW POLYESTER FABRIC MATERIAL AND DYEING PROCESS THEREFOR

[75] Inventors: Edgar Earl Renfrew; Dominic Andrew Zanella, both of Lock Haven, Pa.

[73] Assignee: American Aniline Products, Inc., Paterson, N.J.

[22] Filed: Feb. 5, 1973

[21] Appl. No.: 329,892

Related U.S. Application Data

[63] Continuation-in-part of Ser. No. 80,171, Oct. 12, 1970, abandoned.

[52] U.S. Cl................ 8/41 C, 260/207, 260/207.1
[51] Int. Cl................................................ D06p 1/18
[58] Field of Search............ 8/41 C; 260/207, 207.1

[56] References Cited
UNITED STATES PATENTS

| | | | |
|---|---|---|---|
| 1,975,160 | 10/1934 | Jordan et al. | 260/207.1 |
| 2,941,992 | 6/1960 | Rhyner et al. | 260/205 |
| 3,050,516 | 8/1962 | Morian et al. | 260/205 |
| 3,268,507 | 8/1966 | Kruckenberg | 260/207 |
| 3,536,695 | 10/1970 | Groebke | 260/207.1 |

*Primary Examiner*—Thomas J. Herbert, Jr.
*Attorney, Agent, or Firm*—Armstrong & Wegner

[57] ABSTRACT

Synthetic fabric materials, particularly polyester fabric materials, are dyed a yellow shade through the use of monoazo dyes of the formula:

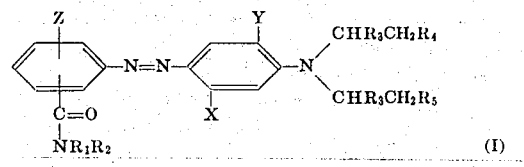

wherein:
- X is hydrogen, chloro or lower alkyl;
- Y is hydrogen or lower alkoxy;
- Z is hydrogen, chloro or lower alkoxy;
- $R_1$ is hydrogen, lower alkyl or phenyl;
- $R_2$ is hydrogen or lower alyl;
- $R_3$ is hydrogen or methyl;
- $R_4$ is cyano, lower carbacyloxy, chloro(lower carbacyloxy) or benzoyloxy; and
- $R_5$ is cyano, lower carbacyloxy, chloro(lower carbacyloxy) or benzoyloxy, or when $R_4$ is benzoyloxy, $R_5$ may be hydrogen.

The above compounds are made by diazotizing an aminobenzamide and coupling the resultant diazonium salt with a tertiary amino base having cyano-lower alkyl or esterfied hydroxy-lower alkyl groups attached to the tertiary amino nitrogen. The dyeings particularly on polyethylene terephthalate fibers, are of a bright yellow shade and are substantive, light fast, and sublimation resistant.

6 Claims, No Drawings

YELLOW POLYESTER FABRIC MATERIAL AND DYEING PROCESS THEREFOR

CROSS REFERENCE TO RELATED APPLICATION

This application is a continuation-in-part of our copending application, Ser. No. 80,171, filed Oct. 12, 1970, now abandoned.

BACKGROUND OF THE INVENTION

Aromatic polyester fibers, such as polyethylene terephthalate fibers, do not readily accept the higher molecular weight dyes, which generally provide dyeings of superior properties. As a result, it is difficult to find dyes of acceptable shade and brightness which, when dyed by conventional methods on for example, polyethylene terephthalate, are acceptable in all of the important physical properties of substantivity, light fastness and resistance to sublimation. The standard of performance required with respect to these physical properties has become increasingly critical because of the demands of the textile industry. Recent standards are such that some dyes which were considered acceptable several years ago are now regarded as unsuitable and have been replaced in the market by dyes of better overall performance.

Comparatively few monoazo dyes have been made from diazotized aminobenzamides. Jordan et al., in U.S. Pat. No. 1,975,160, disclose a series of such dyes made by diazotizing aminobenzamides and coupling them into N,N(di-lower alkyl) anilines. The dyes of Jordan et al are reported to have excellent affinity for cellulose esters and satisfactory fastness to light and washing on, for example, cellulose acetate. However, such dyes when applied to polyester textile material give dyeings which are only fair to poor in sublimation resistance, particularly at high temperatures.

Polyester textile material is conveniently dyed with dispersed dyes by carrier dyeing, pressure dyeing, and by thermofixation methods, such as the "Thermosol" process. An important characteristic of a commercially successful dye for polyesters relates to the ability of the dye to build up in strength on the fabric in proportion to the amount of dye applied. A dye should also color polyesters with little or no variation in shade regardless of the particular dyeing method used.

Although it is known that higher molecular weight dyes generally provide dyeings of better physical properties, the use of a high molecular weight coupler often seriously impairs the ability of the resulting dye to build in strength on polyester fabric in proportion to the amount of dye applied. This problem is encountered when using dyes such as those described in U.S. Pat. No. 3,268,507 in which aminobenzamides are among the bases diazotized and coupled into dihydroxyalkyl substituted tertiary amino coupling components, the hydroxyl groups of which having been reacted with a lower alkyl chloroformate to form carbonate esters. These dyes are suitable for dyeing for thermofixation and carrier dyeing methods, but do not build up on polyester fibers when applied by the pressure dyeing method. Consequently, such dyes are not satisfactory for use in continuous pressure dyeing equipment.

We have discovered new monoazo dyes made from diazotized aminobenzamides which have excellent fastness properties when dyed on aromatic polyester textile fibers and which build in strength when applied by any of the conventional dyeing methods.

SUMMARY OF THE INVENTION

In accordance with a first aspect of the invention, there are provided synthetic fabrics dyed in a bright yellow shade.

In accordance with a second aspect of the invention, there is provided a novel class of monoazo dyes of the formula

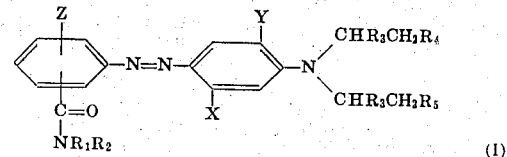

(I)

wherein:
X is hydrogen, chloro or lower alkyl;
Y is hydrogen or lower alkoxy;
Z is hydrogen, chloro or lower alkoxy;
$R_1$ is hydrogen, lower alkyl or phenyl;
$R_2$ is hydrogen or lower alkyl;
$R_3$ is hydrogen or methyl;
$R_4$ is cyano, lower carbacyloxy, chloro (lower carbacyloxy) or benzoyloxy; and
$R_5$ is cyano, lower carbacyloxy, chloro (lower carbacyloxy) or benzoyloxy, or when $R_4$ is benzoyloxy, $R_5$ may be hydrogen.

In accordance with a preferred embodiment of this second aspect of the invention, there are provided a novel subclass of monoazo dyes of the above formula:

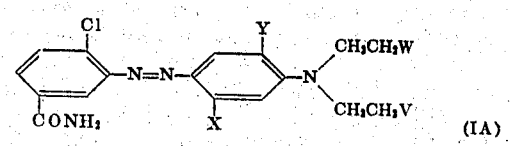

(IA)

wherein:
X is hydrogen, chloro or lower alkyl;
Y is hydrogen or lower alkoxy; and each of V and W is independently cyano of acetoxy.

As preferred lower alkyl groups may be mentioned methyl, ethyl, propyl and butyl, particularly methyl and ethyl. As preferred lower alkoxy groups may be mentioned methoxy, ethoxy, propoxy and butoxy, particularly methoxy and ethoxy. By the terminology lower carbacyloxy is contemplated the grouping Cl-4 alkyl)-COO—, acetoxy being a particularly preferred embodiment. By the term chloro(lower carbacyloxy) is contemplated chloro(Cl-4 alkyl)COO—OO—, particularly chloroacetoxy. Preferably the carbarnyl group is para or meta to the azo group of the monoazo dyes (I); in a particularly preferred embodiment the carbarnyl group is meta to the azo group.

The monoazo dyes (I) when applied to synthetic polyester textile fiber in an amount such that the colored fiber contains about 0.1–2 percent by weight dye, provide colored fibers of bright yellow shades having outstanding sublimation characteristics as well as good substantivity. The monoazo dyes (I) build up well on polyester fiber when applied by any of the conventional dyeing methods.

DETAILED DESCRIPTION

The monoazo dyes (I) are made by conventional methods involving diazotizing an aminobenzamide and coupling the resulting diazonium salt with (1) an N,N-bix (2-lower acyloxy lower alkyl)aniline, either unsubstituted or appropriately substituted with chloro, lower alkyl or lower alkoxy groups; (2) an N,N-bis (2-cyano lower alkyl)aniline, either unsubstituted or appropriately substituted with chloro, lower alkyl or lower alkoxy groups; (3) N-(2-lower acyloxy lower alkyl)-N-(2-cyano lower alkyl)aniline, either unsubstituted or appropriately substituted with chloro, lower alkyl or lower alkoxy groups; and (4) benzoylated N-lower alkyl-anilino lower alkanols, either unsubstituted or appropriately substituted to correspond to X and Y in the formula given above. Other variations of coupling components in which different groups are attached to the tertiary amino nitrogen are evident from the above formula.

Useful bases include 3-amino-4-chlorobenzamide; 4-aminobenzamide; 4-amino-2-chlorobenzamide; 3-amino-4-methoxybenzamides; 3-amino-4-chloro-N,N-dimethylbenzamide; 3-amino-N-ethylbenzamide; 3-aminobenzanilide; 3-amino-4-chloro-N,N-di(2-cyanoethyl)benzamide; 4-amino-3-chlorobenzanilide; 4-amino-3-chlorobenzamide; 4-amino-3-chloro-N-(n-propyl)benzamide.

Typical useful couplers are N,N-bis(2-acetoxyethyl) aniline; N,N-bis(2-cyanoethyl)aniline; N-(2-acetoxyethyl)-N-(2-cyanoethyl)aniline; N-(2-benzoyloxyethyl)N-ethylaniline; N,N-bis(2-acetoxyethyl)-m-toluidine; N,N-bis(2-cyanoethyl)-m-toluidine; N-(2-propionyloxyethyl) N-(2-cyanoethyl)-m-toluidine; N,N-bis(2-acetoxyethyl)-5-methyl-o-anisidine; N,N-bis(2-cyanoethyl)-m-chloroaniline; N[-2-(n-butyryloxy)ethyl]-N-(2-cyanoethyl)-o-phenetidine.

The base is diazotized by any conventional method, for example, in the case of 3-amino-4-chlorobenzamide, the benzamide is first dissolved in dilute hydrochloric acid. The solution is iced in 0° C and sufficient sodium nitrite is added to form the diazonium salt at a temperature below 5° C. Diazotization is complete in about one hour and excess nitrite can be removed with sufficient sulfanic acid. The diazo solution is filtered, and the filtrate is kept cold for coupling.

The coupling components can be made by any suitable process such as by the conventional esterification of the appropriate 2,2'-(phenylimino)diethanol or in the case of those couplers containing cyano alkyl groups, by the reaction of an appropriate aniline intermediate with acrylonitrile.

Coupling is carried out in a neutral to acid medium, if desired, in the presence of sodium acetate or a similar buffer substance capable of controlling the speed of the coupling or in the presence of a catalyst such as pyridine or a salt thereof. Coupling generally requires from about 10 to about 20 hours, after which time the product dye is easily separated from the coupling mixture by filtration and the filtered cake is washed with water until the washings are acid-free.

The monoazo dye (I) may be standardized either as a disperse paste or a dispsese powder by any of the basic standardizing techniques that have been known to the art for many years; i.e., by the use of appropriate amounts of common dispersants and standardizing agents, usually together with small amounts of anionic wetting agent to assist in dispersion.

Standardized pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The dispersed paste may be cut or standardized to a standard strength with water. The final color content of the finished paste averages from 10–40 percent by weight (pure color) active dye base.

Standardized dispersed powders are prepared by wet milling color in the presence of a dispersant, such as those mentioned hereabove, in equipment, such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to wet out the product. Dispersed powders are usually cut or standardized to 26-60 percent by weight color content (pure color).

The monoazo dye (I), when added to water with or without auxiliary agents, forms a near colloidal aqueous dispersion from which the aromatic polyester fiber or textile material is dyed in the conventional manner at 40°–100° C (104°–212° F) to give a colored fiber containing about 0.01-2 percent by weight dye (100 percent color basis).

Alternatively, dyeing may be accomplished without a carrier at temperatures of 100°–150° C under pressure. Also, the dye may be applied in patterns by conventional printing methods, if desired.

The monoazo dye (I) can also be applied to the aromatic polyester fiber by thermofixation methods, such as the "Thermosal" process. This process, which involves padding the cloth with the diluted dye dispersion followed by drying and heating the dried goods with hot air or heated contact rolls, is conveniently used for dyeing polyester fibers and blends containing these fibers. Temperatures of 180°–220° C (ca. 360°–425° F) are used for 30 to 90 seconds. If the fabric contains cotton or viscose rayon, apart from synthetic fibers, there is no danger of damaging cellulosic portions, but if wool is present, the temperature must be kept within 180°–200° C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

Example 1

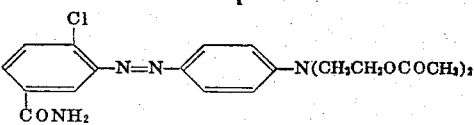

A. Diazotization

To a 1 liter beaker was charged 120 ml. hot water, 60 g. hydrochloric acid (32 percent by weight) 34.1 g. 3-amino-4-chlorobenzamide and 5 g. Tween 20, (a commercially available surface active material said to be "polyoxyethylene sorbitan monolaurate"). The mixture was stirred until the solids were dissolved. The solution was cooled to 0° C by the addition of ice. To the stirred solution at 0–5° C was added dropwise over 1 hour a solution of 14.0 g. sodium nitrite in 35 mil. water. Stirring was continued for one more hour at 0°–5°, during which time a slight excess of nitrite was maintained by small additions. At the end of the period, the excess of nitrite was removed with sufficient sulfamic acid. The cold solution was filtered and the filtrate kept cold.

B. Coupler

To a 500 ml. flask was charged 50.0 g. glacial acetic acid and 370 g. 2,2'-(phenylimino)diethanol. The solution was heated to 95° C. To the stirred solution at 95°–100° C was added slowly 42.0 g. acetic anhydride. After the addition, stirring at 95°–100° C was continued 1 hour. The contents of the flask were then poured into a 3 liter beaker containing 600 g. ice, 1,500 ml. water, and 25 g. hydrochloric acid (32 percent). The mixture was stirred one-half hour.

C. Coupling

Ice was added to the solution B to bring the temperature to 0° C. To the stirred solution was added in a slow stream the solution A; the temperature was maintained at 0°–5° during the addition. Then was added slowly a solution of 45.0 g. sodium acetate in 225 ml. water.

The mass was stirred for sixteen hours during which time its temperature was allowed to rise to that of the surroundings.

The precipitate was collected on a filter and washed with water until the washings were no longer acidic. The cake after drying at 80° C weighed 85.2 g.

D. Dispersion

To a ball mill of suitable size was charged 60 g. of the dried product C, 60 g. "Marasperse N-22" (a commercially available sodium ligninsulfonate) and 280 ml. water. Milling was continued until a satisfactory dispersion had been reached as shown by a rate-of-filtration test.

E. Dyeing and Testing

An aqueous dye bath containing 10 percent Marcron L (a commercially available phenolic dye carrier) and 1 percent monosodium phosphate as a buffering agent was prepared. Type 54 Dacron polyester fabric was treated in a bath at 120° F for 10 minutes, the fabric to water dye bath ratio being 1:40. The dispersed dye paste D was added in an amount sufficient to provide a bath containing 2 percent dye based on the weight of polyester fiber. Dyeing was continued for one hour at 205° F and the fabric was removed from the bath, rinsed and dried. The hue was a bright golden yellow.

Sample dyeings were tested for sublimation according to standard AATCC Color Fastness to Dry Heat sublimation Test No. 117-1967T, Page B-74 of the 1967 Technical Manual of the American Association of Textile Chemists and Colorists. The dyed fabric was placed between a sandwich of undyed Dacron polyester fabric and heat was applied for 30 seconds. Sublimation tests were made at 375° F, 400° F, and 425° F on goods as described above. The dyeing was characterized by excellent sublimation even at temperatures of 400° and 425° F.

Similar excellent results were obtained when the dye was applied to the fabric by the Thermosol process and the pressure dyeing method and then tested for sublimation as described above. The build-up on the fiber in both cases was also excellent.

The dyeings were also tested for light fastness by subjecting them to carbon arc fading in accordance with AATCC Color Fastness to Light: Carbon Arc Lamp, Continuous Light Test No. 16A-1964. The dyeings showed only a very slight break at 20 hours' exposure indicating adequate fastness to light.

Example 2

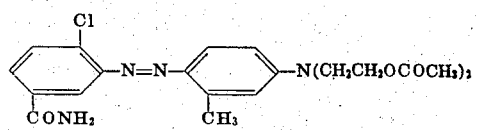

A. Diazotization

A solution was prepared exactly as described in Example 1, Part A.

B. Coupler

In the manner of Example 1, Part B, but substituting 40.0 g. 2,2'-(m-tolylimino)diethanol for the 2,2'-(phenylimino) diethanol, a coupler solution was prepared.

C. Coupling

The solutions A and B were combined in the manner described in Example 1, Part C. The yield of dried product was 84.0 g.

D. Dispersion

The product C was dispersed in the way described in Example 1, Part D. The paste obtained was spray dried, yielding a powder which was 50 percent dye and 50 percent dispersing agent.

E. Dyeing and Testing

The powder, D, was applied to polyester terephthalate fibers in the ways referred to in Example 1, Part E. The hue was yellow, but somewhat redder than the material of Example 1. Performance properties were similarly good.

Example 3

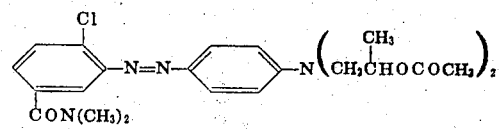

A. Diazotization

By the same procedure given in Example 1, Part A, there was diazotized 39.7 g. 3-amino-4-chloro-N,N-dimethylbenzamide.

B. Coupler

A coupler solution was prepared in the way described in Example 1, Part B, except that 42.0 g. 2,2'-(phenylimino)-dipropanol was used instead of 2,2'-(phenylimino)diethanol.

C. Coupling

The materials A and B were combined in the same way described in Example 1, Part C. The yield was 90.0 g. dry material.

D. Dispersion

The material C was dispersed in the way described in Example 1, Part D.

E. Dyeing and Testing

Dyeings were made in the way referred to in Example 1, Part E. Properties of the dyeings were like those of the product of Example 1. The sublimation test was slightly superior.

Example 4

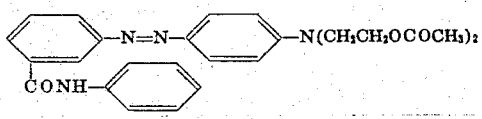

A. Diazotization

To a 1 liter beaker was charged 150 ml. hot water, 60 g. hydrochloric acid (32 percent) and 42.2 g. 3-aminobenzanilide. Stirring was carried on until the material was dissolved. To the stirred solution at 0°–5° C was added slowly over one hour a solution of 14.0 g. sodium nitrite in 40 ml. water. The diazotization mass was stirred for an additional hour at 0°–5° C, during which time a slight excess of nitrite was maintained. At the end of the period, the excess of nitrite was removed by the addition of sufficient sulfamic acid. The cold solution was clarified through a bed of diatomaceous earth filter aid, and preserved cold for use in C.

B. Coupler

A coupler solution was made in exactly the way described in Example 1, Part B.

C. Coupling

The solutions A and B were combined in essentially the manner detailed in Example 1, Part C. The filter cake was not dried. A dry test indicated that aproximately 96 g. product had been obtained.

D. Dispersion

Wet cake C containing a calculated 50 g. was dispersed in a ball mill with 50 g. sodium ligninsulfonate (a commercial grade, "Marasperse N-22" was used) and 400 ml water until an adequate filter test had been attained.

E. Dyeing and Testing

The disperse paste D was dyed in the conventional ways, e.g., carrier, pressure and thermofixation. Dyed fabrice were a clear golden yellow hue. The dyeings showed good performance characteristics in the tests prescribed by the AATCC. The dye is especially suitable for thermofixation dyeings. Sublimation fastness if particularly good.

Example 5

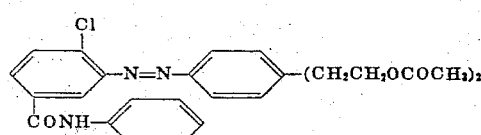

A. Diazotization

A solution was made from 49.3 g. 3-amino-4-chlorobenzanilide in the manner described in Example 4, Part A for 3-aminobenzanilide.

B. Coupler

A solution was prepared exactly as described in Example 1, Part B.

C. Coupling

The combination of the solutions A and B was carried out as indicated in Example 4, Part C. The yield was 96 g. isolated as moist cake.

D. Dispersion

A disperse paste was made in the way defined in Example 4, Part D.

E. Dyeing and Testing

Polyester fabrics dyed with the paste D in the conventional ways were golden yellow in hue. AATCC tests showed remarkable resistance to sublimation. The dye is particularly suited to application by thermofixation methods.

Example 6

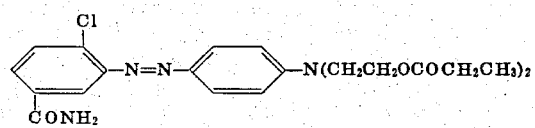

A. Diazotization

A solution was made in the way described in Example 1, Part A.

B. Coupler

To a 500 ml. flask was charged 60 g. propionic acid and 37.0 g. 2,2'-(phenylimino)diethanol. The stirred solution was heated to 95° C, at which temperature 55.0 g. propionic anhydride was run in slowly. Stirring was continued for another hour, during which time the temperature was maintained above 95° C. The solution after cooling somewhat, was then poured into a 4-liter beaker containing 400 g. ice, 3,500 ml water and 25 g. hydrochloric acid (32 percent). The mixture was stirred for another hour before use in the coupling.

C. Coupling

The solutions A and B were combined in the manner described in Example 1, Part C. The indicated yield of dye contained in the moist cake was 87 g.

D. Dispersion

The product C was dispersed to a 50 percent powder in the way described in Example 2, Part D.

E. Dyeing and Testing

Dyeing and testing were carried out as indicated in Example 2, Part E. The dyed polyester material looked and performed much like the dyed goods of Example 1, Part E.

Example 7

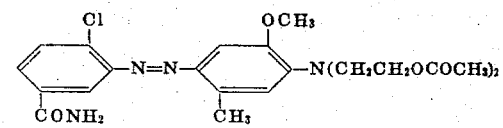

A. Diazotization

A solution was made in the way described in Example 1, Part A.

B. Coupler

To a 500 ml. flask was charged 50 g. glacial acetic acid, and 45.5 g. 2,2'-(6-methoxy-m-tolylimino)diethanol. To the stirred solution at 95°–100° C was added slowly 45.0 g. acetic anhydride. Stirring at 100° C was continued for 1 hour after the addition had been completed. After cooling somewhat the contents of the flask were poured into a 3 liter beaker containing 400 g. ice, 3,500 ml. water and 25 g. hydrochloric acid (32 percent). The solution was stirred for one-half hour.

C. Coupling

The solutions A and B were combined in the way described in Example 1, Part C. An indicated yield of 88 g. was obtained as wet cake.

D. Dispersion

The cake D was dispersed to a 15 percent paste in the way described in Example 1, Part D.

E. Dyeing and Testing

Standard dyeing methods and AATCC testing procedures were carried out in the manner indicated in Example 1, Part E. Hues were reddish-orange. Properties were good, with resistance to sublimation outstanding.

Example 8

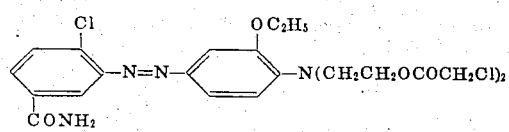

A. Diazotization

A solution was prepared exactly as in Example 1, Part A.

B. Coupler

To a 500 ml. flask was charged 60.0 g. chloroacetic acid and 44.8 g. 2,2'-(o-ethoxyphenylimino)diethanol. The mass was heated until it became stirrable, ca. 60° C. At 80°–86° C, while stirring, was added over 1 hour 47.0 g. chloroacetyl chloride. After the addition, the mass was stirred 1 hour at 80° C, cooled somewhat and drowned into a 2 liter beaker containing 800 ml. cold water, 200 g. ice, 40 g. hydrochloric acid (32 percent) and 2 g. Tween 20, a commercially available material said to be a polyoxyethylene sorbitan monolaurate. The drowning mass was clear.

C. Coupling

Combining of the solutions A and B was carried out in essentially the way described in Example 1, Part C. A yield of 104 g. was obtained as moist filter cake.

D. Dispersion

A 15 percent paste was prepared in the way detailed in Example 1, Part D.

E. Dyeing and Testing

Fabric samples dyed in the ways indicated in Example 1, Part E were subjected to test procedures recommended by AATCC. Properties were very good; sublimation fastness was exceptionally good. The hue was orange.

Example 9

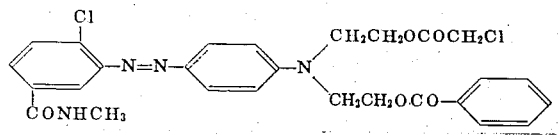

A. Diazotization

A solution was prepared in the way described in Example 1, Part A, except that 36.5 g. 3-amino-4-chloro-N-methylbenzamide was used instead of the 3-amino-4-chlorobenzamide.

B. Coupler

To a 500 ml. flask was charged 75.0 g. chloroacetic acid and 30.0 g. benzoyl chloride. The mixture was heated to 65° C over one-half hour at which temperature 36.6 g. 2,2'-(phenylimino) diethanol was added to the stirred mass. A slight rise in temperature took place during the addition. Stirring at 70° was continued for 3 hours. The charge was then poured into a 2 liter beaker charged with 200 g. ice, 200 ml. cold water, 40.0 of hydrochloric acid (32 percent) and 5 g. "Tween 20," (a commercially available polyoxyethylene sorbitan monolaurate). Stirring was carried on for one hour more, after which the solution was clarified through a diatomaceous earth filter bed.

C. Coupling

The combining of the solution A and B was carried out as described in Example 1, Part C. Approximately 88 g. was obtained as moist cake. Thin layer chromatography showed the presence of several components, of which the structure given is probably a major one.

D. Dispersion

The cake C was dispersed to a 15 percent paste in the manner described in Example 1, Part D.

E. Dyeing and Testing

Dyeings were made in the manner indicated in Example 1, Part E, and tested by AATCC methods. The hue was golden yellow. Properties, especially fastness to sublimation, were very good.

Example 10

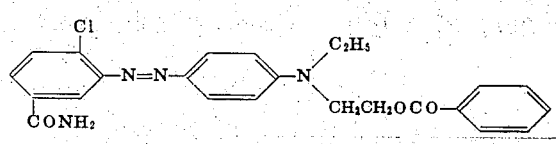

A. Diazotization

A solution was prepared exactly as described in Example 1, Part A.

B. Coupler

To a 500 ml. flask was charged 33.0 g. 2(N-ethylanilino) ethanol. To this material at 70°–80° C was added alowly 28.0 g. benzoyl chloride. The mixture was stirred at 70°–80° C for 2 hours, after which it was heated to 90° C. The mass was poured slowly into a stirred mixture made of 400 g. ice, 400 ml. water, 25 g. hydrochloric acid, 32 percent and 5 g. "Tween 20," a commercially available surface active material. The drowning mixture was stirred for one more hour.

C. Coupling

The solutions A and B were combined in essentially the way described in Example 1, Part C. The yield of dried cake was 73.0 g.

D. Dispersion

A paste of 15 percent color content was made by milling the product C with a dispersing agent and water in the way described in Example 1, Part D.

E. Dyeing and Testing

Polyester fabric was dyed by the several methods noted in Example 1, Part E. Tests conducted by AATCC specification showed the present dye to have excellent fastness properties. sublimation fastness is remarkably good. The hue is golden yellow.

Examples 11 to 17

By procedures essentially as given in Example 1 to 10, bases and couplers give dyes as tabulated.

| Example | Base | Coupler | Dye | Hue |
|---|---|---|---|---|
| 11 | H₂NCO-C₆H₄-NH₂ | C₆H₅-N(CH₂CH₂OCOCH₃)₂ | H₂NCO-C₆H₄-N=N-C₆H₄-N(CH₂CH₂OCOCH₃)₂ | Yellow. |
| 12 | 2-Cl, 4-CONH₂ aniline (NH₂) | 3-Cl-C₆H₄-N(CH₂CH₂OCOCH₃)₂ | Azo dye: (Cl, CONH₂)C₆H₃-N=N-C₆H₃(Cl)-N(CH₂CH₂OCOCH₃)₂ | Golden-yellow. |
| 13 | 2-Cl, 4-CONH₂, H₂NCO- substituted aniline | C₆H₅-N(CH₂CH₂OCOCH₃)₂ | H₂NCO-C₆H₃(Cl)-N=N-C₆H₄-N(CH₂CH₂OCOCH₃)₂ | Yellow. |
| 14 | OCH₃, CONH₂ aniline (NH₂) | 2-OCH₃, 5-CH₃ aniline -N(CH₂CH₂OCOCH₂Cl)₂ | (OCH₃, CONH₂)C₆H₃-N=N-C₆H₂(OCH₃)(CH₃)-N(CH₂CH₂OCOCH₂Cl)₂ | Yellowish-red. |
| 15 | 2-Cl, 4-CONH₂ aniline (NH₂) | C₆H₅-N(CH₂CH₂OCOCH₃)(CH₂CH₂CN) | (Cl, CONH₂)C₆H₃-N=N-C₆H₄-N(CH₂CH₂OCOCH₃)(CH₂CH₂CN) | Golden-yellow. |
| 16 | OC₂H₅, CONH₂ aniline (NH₂) | 3-CH₃-C₆H₄-N(CH₂CH₂OCOC₃H₇)₂ | (OC₂H₅, CONH₂)C₆H₃-N=N-C₆H₃(CH₃)-N(CH₂CH₂OCOC₃H₇)₂ | Reddish-orange. |
| 17 | OCH₃, CONH₂ aniline (NH₂) | 2,5-(OCH₃)₂-C₆H₃-N(CH₂CH₂OCOCH₃)₂ | (OCH₃, CONH₂)C₆H₃-N=N-C₆H₂(OCH₃)₂-N(CH₂CH₂OCOCH₃)₂ | Red. |

Example 18

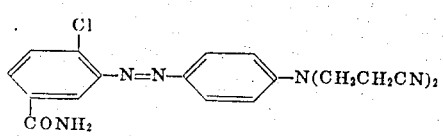

A. Diazotization

A solution was prepared exactly as described in Example 1, Part A.

B. Coupler

To a 400 ml. beaker containing 200 ml. water was charged while stirring 39.8 g. 3,3'-(phenylimino)dipropionitrile and 30 g. concentrated hydrochloric acid. Stirring was continued for 1 hour.

C. Coupling

Ice was added to the coupler solution (Part B) until the temperature was 0° C. The clarified diazonium solution from Part A was slowly added to the stirred coupler solution; ice was added as needed to maintain the temperature at 0°–5° C. After the addition was complete, stirring was continued for four hours during which the temperature was maintained at 0°–5° C, and ten hours during which time it was allowed to rise spontaneously to that of the room. The solid coupling product was then isolated by filtration, washed acid free on the filter, and dried. It weighed 69.6 g.

D. Dispersion

A 15 percent color content disperse paste was prepared exactly as described in Example 1.

E. Dyeing and Testing

Golden-yellow dyeings were prepared in the manner described in Example 1. Properties were excellent. The dyestuff is especially suited for dyeing by the thermofixation method, yielding dyeings of outstanding sublimation and good light fastness.

The foregoing dyes also color cellulose triacetate in good shades of excellent fastness. Many of them, especially the dyes of Examples 1, 2, 6, 11, 14 and 15, also yield dyeings of excellent properties on secondary cellulose acetate.

What is claimed is:

1. An aromatic polyester fabric material dyed with a compound of the formula:

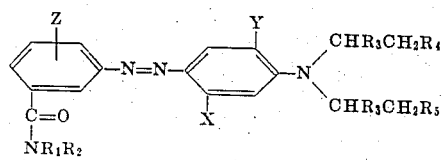

wherein:
  X is hydrogen, chloro or lower alkyl;
  Y is hydrogen or lower alkoxy;
  Z is hydrogen, chloro or lower alkoxy;
  $R_1$ is hydrogen, lower alkyl or phenyl;
  $R_2$ is hydrogen or lower alkyl;
  $R_3$ is hydrogen or methyl;
  $R_4$ is cyano, lower carbacyloxy, chloro(lower carbacyloxy) or benzoyloxy; and
  $R_5$ is cyano, lower carbacyloxy, chloro(lower carbacyloxy) or benzoyloxy, or when $R_4$ is benzoyloxy, $R_5$ may be hydrogen.

2. The dyed material of claim 1 wherein said aromatic polyester fabric material is polyethylene terephthalate.

3. An aromatic polyester fabric material of claim 1 wherein said compound is of the formula:

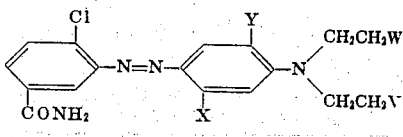

wherein:
  X is hydrogen, chloro or lower alkyl;
  Y is hydrogen or lower alkoxy; and each of V and W is independently cyano or acetoxy.

4. An aromatic polyester fabric material of claim 3 wherein said compound is of the formula:

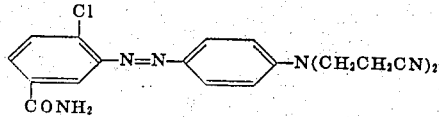

5. An aromatic fabric material of claim 3 wherein said compound is of the formula:

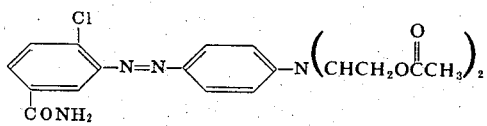

6. An aromatic polyester fabric material of claim 3 wherein said compound is of the formula:

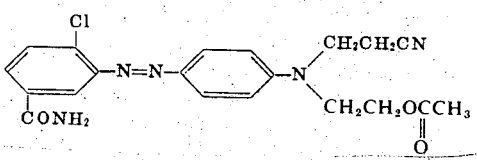

* * * * *